(12) United States Patent
Kato et al.

(10) Patent No.: US 6,682,060 B2
(45) Date of Patent: Jan. 27, 2004

(54) DYNAMIC DAMPER

(75) Inventors: Kazuhiko Kato, Komaki (JP); Seiya Asano, Aichi-ken (JP)

(73) Assignee: Tokai Rubber Industries, Ltd., Aichi-ken (JP)

( * ) Notice: Subject to any disclaimer, the term of this patent is extended or adjusted under 35 U.S.C. 154(b) by 108 days.

(21) Appl. No.: 10/284,687

(22) Filed: Oct. 31, 2002

(65) Prior Publication Data

US 2003/0080484 A1 May 1, 2003

(30) Foreign Application Priority Data

Oct. 31, 2001 (JP) ........................... 2001-334856

(51) Int. Cl.$^7$ ................................................. F16F 7/00
(52) U.S. Cl. ........................................ 267/141; 74/574
(58) Field of Search .............................. 74/574; 267/141, 267/141.2, 293; 188/378, 379; 464/180

(56) References Cited

U.S. PATENT DOCUMENTS

| | | | | |
|---|---|---|---|---|
| 4,223,565 A | * | 9/1980 | Sugiyama et al. | 74/574 |
| 5,056,763 A | * | 10/1991 | Hamada et al. | 267/141 |
| 6,308,810 B1 | * | 10/2001 | Kuwayama | 188/379 |
| 6,485,370 B1 | * | 11/2002 | Kurosu et al. | 464/180 |
| 6,499,730 B1 | * | 12/2002 | Kuwayama et al. | 267/141 |

FOREIGN PATENT DOCUMENTS

| | | |
|---|---|---|
| JP | 2000-055130 A | 2/2000 |
| JP | 2000-240725 A | 9/2000 |
| JP | 2001-280420 A | 10/2001 |
| JP | 2002-098186 A | 4/2002 |
| JP | 2002-098193 A | 4/2002 |

* cited by examiner

*Primary Examiner*—Christopher P. Schwartz
(74) *Attorney, Agent, or Firm*—Akin Gump Strauss Hauer & Feld, L.L.P.

(57) ABSTRACT

A dynamic damper includes a cylindrical mass metal element, a cylindrical elastic-body attachment portion, a cylindrical elastic-body connection portion, and an elastic-body covering portion. The elastic-body attachment portion is formed from a rubber elastic body and coaxially disposed inside the mass metal element while a predetermined radial distance is maintained therebetween. The elastic-body connection portion is formed from a rubber elastic body and disposed between the mass metal element and the elastic-body attachment portion so as to connect them. The elastic-body covering portion covers the outer circumferential surface of the mass metal element. The elastic-body connection portion and the elastic-body covering portion are not bonded to the mass metal element. A plurality of protrusions are formed and arranged circumferentially on the inner circumferential surface of the mass metal element.

3 Claims, 7 Drawing Sheets

Prior Art

Fig. 11

DYNAMIC DAMPER

BACKGROUND OF THE INVENTION

1. Field of the Invention

The present invention relates to a dynamic damper which is fitted onto a rotary shaft such as a drive shaft of a vehicle so as to damp vibrations of the rotary shaft.

2. Description of the Related Art

Conventionally, a dynamic damper of this kind includes a cylindrical mass metal element, and a cylindrical rubber elastic-body member which is attached to the mass metal element and fitted onto a rotary shaft whose vibrations are to be damped so as to elastically support the mass metal element on the rotary shaft. In the dynamic damper, in order to enhance adhesion between the mass metal element and the rubber elastic-body member, the mass metal element and the rubber elastic-body member are formed integrally by the steps of applying adhesive to the surface of the mass metal element and subjecting the resultant mass metal element to rubber vulcanization molding. In order to meet a conventionally existing demand for reduction in manufacturing cost, various studies have been conducted on a method for manufacturing the mass metal element and a process for manufacturing the dynamic damper. One of these studies concerns a nonadhesion-type dynamic damper, which is manufactured without use of adhesive.

Figure 11:
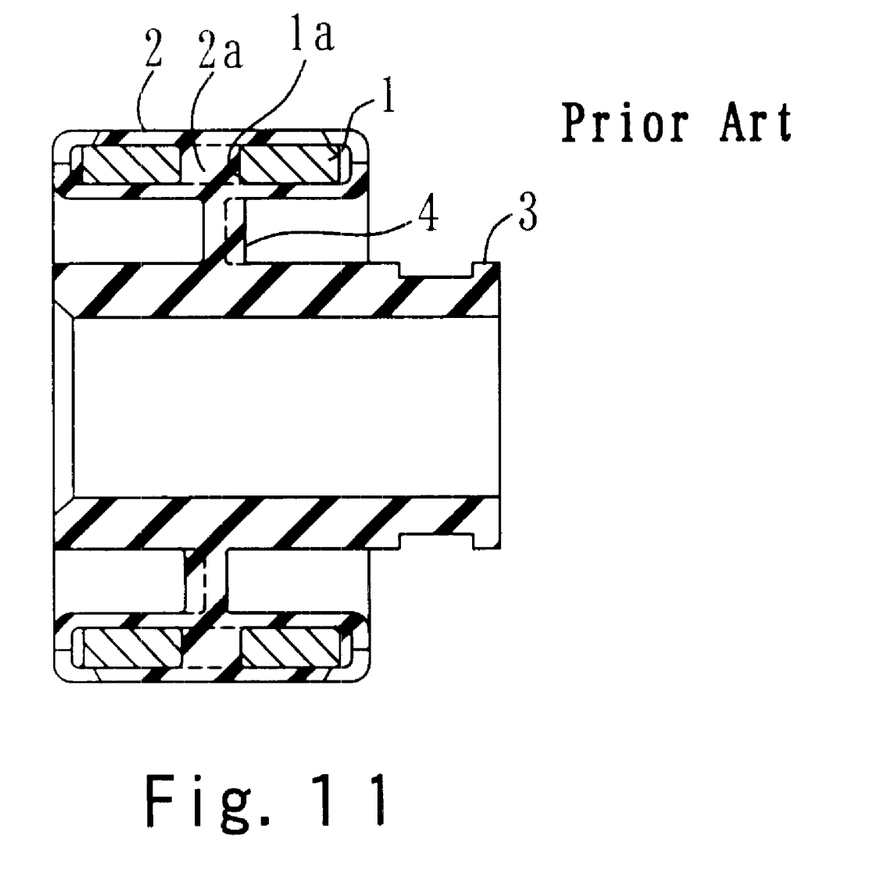
FIG. 11 is a sectional view showing a conventional dynamic damper.

For example, the dynamic damper (see FIG. 11) disclosed in Japanese Patent Application Laid-Open (kokai) No. 2000-240725 includes a cylindrical mass metal element 1, a cylindrical elastic-body attachment portion 3, and an elastic-body connection portion 4. The mass metal element 1 is covered with a rubber elastic-body covering layer 2. The elastic-body attachment portion 3 is formed from a rubber elastic body and coaxially disposed inside the mass metal element 1 while a predetermined radial distance is maintained therebetween. The elastic-body connection portion 4 is formed from a rubber elastic body and disposed between the mass metal element 1 and the elastic-body attachment portion 3 so as to connect the element 1 and the portion 3. A plurality of through-holes 1a are formed in the mass metal element 1 while being arranged circumferentially and located at the axially central position. The through-holes 1a are filled with the rubber elastic body, which has moved therein from the covering layer 2, thereby forming respective linkage portions 2a. The thus-formed linkage portions 2a can enhance retention of the mass metal element 1 effected by the elastic-body connection portion 4.

However, the above-described dynamic damper requires a step of drilling the through-holes in the mass metal element, which increases manufacturing cost. Also, when the mass metal element is to be manufactured through press bending, the through-holes may be arranged in an unbalanced condition, possibly impairing vibration-damping characteristics. Further, provision of the through-holes reduces the weight of the mass metal element, thereby narrowing the range of vibration-damping characteristics. In order to avoid this problem, the size of the mass metal element must be increased. Also, when the elastic-body attachment portion is fitted onto the rotary shaft, provision of the linkage portions formed in the respective through-holes produces a difference in contraction between the linkage portions and other portions which cover the mass metal element. As a result, a clearance may be formed between the mass metal element and the rubber elastic body, possibly impairing vibration-damping characteristics of the dynamic damper.

SUMMARY OF THE INVENTION

An object of the present invention is to solve the above-mentioned problems in the conventional dynamic damper and to provide a dynamic damper capable of retaining a mass metal element by means of an elastic-body member without use of adhesive and substantially increasing the mass of the mass metal element without increasing the size thereof.

To achieve the above object, according to a first aspect of the present invention, there is provided a dynamic damper comprising a cylindrical mass metal element, and a cylindrical elastic-body member disposed coaxially with respect to the mass metal element and fitted onto a rotary shaft whose vibrations are to be damped so as to elastically support the mass metal element on the rotary shaft. The elastic-body member is not bonded to the mass metal element. A plurality of protrusions are formed and arranged circumferentially on the surface of the mass metal element where the mass metal element is supported by the elastic-body member.

According to the first aspect, the mass metal element does not have radially extending through-holes formed therein and is not bonded to the elastic-body member, but instead a plurality of protrusions are formed and arranged circumferentially on the surface of the mass metal element where the mass metal element is supported by the elastic-body member. The protrusions are embedded in the elastic-body member, thereby reliably preventing circumferential movement of the mass metal element relative to the elastic-body member. Thus, the dynamic damper can implement enhanced retention of the mass metal element by means of the elastic-body member. As a result, use of adhesive is not required, thereby simplifying a dynamic damper manufacturing process and reducing manufacturing cost. Also, since the protrusions are embedded in the elastic-body member, the mass of the mass metal element can be substantially increased without need to increase the size thereof, thereby expanding the range of vibration-damping characteristics effected by the mass metal element.

According to a second aspect of the present invention, there is provided a dynamic damper comprising a cylindrical mass metal element; a cylindrical elastic-body member extending radially inward from the mass metal element toward a center axis of the mass metal element and fitted onto a rotary shaft whose vibrations are to be damped so as to elastically support the mass metal element on the rotary shaft; and an elastic-body covering portion covering the outer circumferential surface of the mass metal element. The elastic-body member and the elastic-body covering portion are not bonded to the mass metal element. A plurality of protrusions are formed and arranged circumferentially on the inner circumferential surface of the mass metal element.

According to the second aspect, the mass metal element does not have radially extending through-holes formed therein and is not bonded to the elastic-body member, but instead a plurality of protrusions are formed and arranged circumferentially on the inner circumferential surface of the mass metal element which comes into contact with the elastic-body member. The protrusions are embedded in the elastic-body member, thereby reliably preventing axial movement and circumferential movement of the mass metal element relative to the elastic-body member. Thus, the dynamic damper can implement enhanced retention of the mass metal element by means of the elastic-body member. As a result, use of adhesive is not required, thereby simplifying a dynamic damper manufacturing process and reducing manufacturing cost. Also, since the protrusions are embedded in the elastic-body member, the mass of the mass metal element can be substantially increased without need to increase the size thereof, thereby expanding the range of vibration-damping characteristics effected by the mass metal element. Further, since the protrusions are embedded in the elastic-body member, when the elastic-body member is fitted onto the rotary shaft, radial expansion of the elastic-body member imposes a compressive force on the mass metal element, thereby enhancing the retention of the mass metal element by the elastic-body member. Also, the elastic-body covering portion protects the mass metal element from smudging and corrosion.

According to a third aspect of the present invention, there is provided a dynamic damper comprising a cylindrical mass metal element; a pair of cylindrical elastic-body attachment portions disposed a predetermined distance outwardly away from corresponding axial opposite ends of the mass metal element while being coaxial with the mass metal element, the elastic-body attachment portions each having an inside diameter smaller than that of the mass metal element and being fitted onto a rotary shaft whose vibrations are to be damped so as to fixedly attach the dynamic damper on the rotary shaft; a pair of elastic-body connection portions adapted to connect the axial opposite ends of the mass metal element and the corresponding elastic-body attachment portions along the entire circumference; and elastic-body covering portions covering inner and outer circumferential surfaces of the mass metal element. The elastic-body connection portions and the elastic-body covering portions are not bonded to the mass metal element. A plurality of protrusions are formed and arranged circumferentially on the opposite end faces of the mass metal element.

According to the third aspect, the mass metal element does not have through-holes formed therein and is not bonded to the paired elastic-body connection portions, but instead a plurality of protrusions are formed and arranged circumferentially on the opposite end faces thereof, which are connected to the corresponding elastic-body connection portions. The protrusions are embedded in the elastic-body connection portions, thereby reliably preventing circumferential movement of the mass metal element relative to the elastic-body connection portions. Thus, the dynamic damper can implement enhanced retention of the mass metal element by means of the elastic-body member. As a result, use of adhesive is not required, thereby simplifying a dynamic damper manufacturing process and thus reducing manufacturing cost. Also, since the protrusions are embedded in the elastic-body connection portions, the mass of the mass metal element can be substantially increased without need to increase the size thereof, thereby expanding the range of vibration-damping characteristics effected by the mass metal element. Also, the elastic-body covering portions protect the mass metal element from smudging and corrosion.

DESCRIPTION OF THE PREFERRED EMBODIMENTS

Embodiments of the present invention will next be described in detail with reference to the drawings.

FIGS. 1 to 4 show a side view, sectional views, and a perspective view of a dynamic damper 10 according to a first embodiment of the present invention. The dynamic damper 10 is attached to a drive shaft S of a vehicle. The dynamic damper 10 includes a cylindrical mass metal element 11, a cylindrical elastic-body attachment portion 15, a cylindrical elastic-body connection portion 17, and a thin elastic-body covering portion 19. The elastic-body attachment portion 15 is formed from a rubber elastic body and coaxially disposed inside the mass metal element 11 while a predetermined radial distance is maintained therebetween. The elastic-body connection portion 17 is formed from a rubber elastic body and disposed between the mass metal element 11 and the elastic-body attachment portion 15 so as to connect the member 11 and the portion 15. The elastic-body attachment portion 15 and the elastic-body connection portion 17 constitute an elastic-body member. The elastic-body covering portion 19 is formed from a rubber elastic body and covers the outer circumferential surface of the mass metal element 11.

Figure 5:
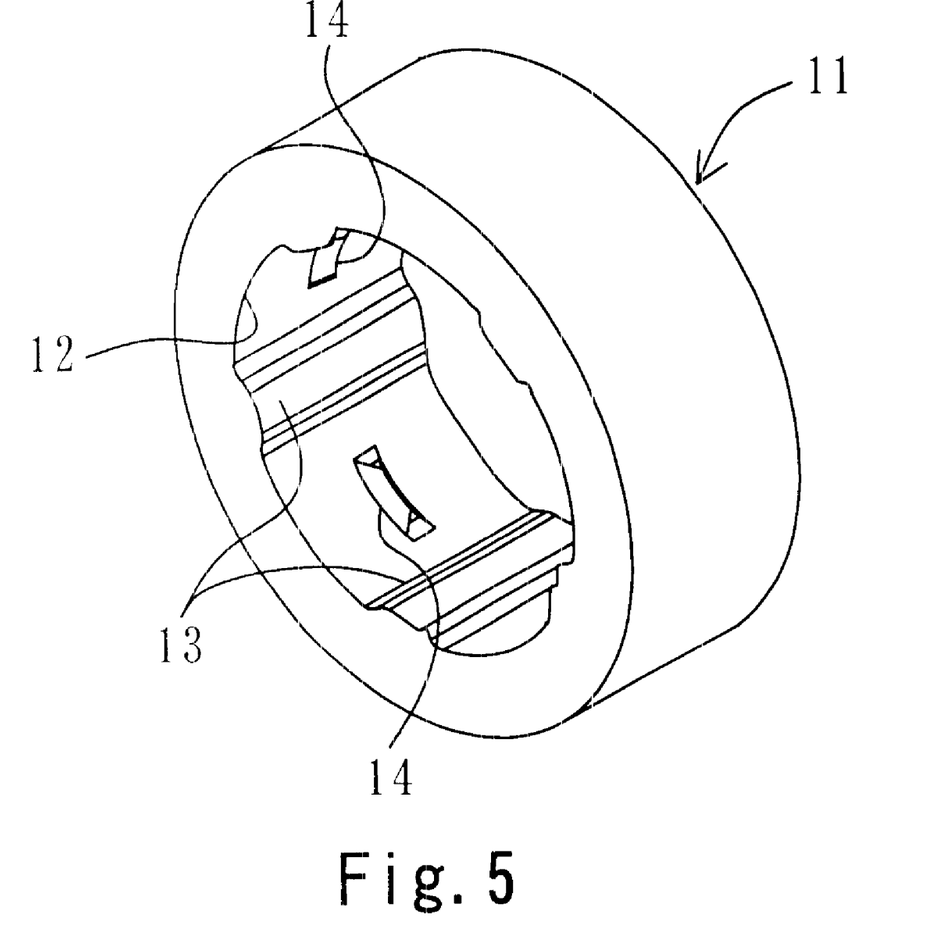
FIG. 5 is a perspective view showing a mass metal element used in the dynamic damper of FIG. 1.

The mass metal element 11 is a thick-walled cylindrical metal element having an axial length shorter than that of the elastic-body attachment portion 15. As shown in FIG. 5, in the mass metal element 11, five first protrusions 13 each having a trapezoidal cross section are formed and arranged circumferentially at equal intervals on an inner circumferential surface 12 while protruding radially inward and extending axially between the opposite ends thereof. Further, second protrusions 14 each having a triangular cross section and elongated slightly in the circumferential direction are formed and arranged circumferentially in such a manner as to be each located between the first protrusions 13 and at the axially central position. The cross-sectional shape of the protrusions 13 and 14 may be circular, rectangular, or crest-like in addition to triangular or trapezoidal.

The mass metal element 11 is formed by a cold or hot forging process, a sintering process, a press bending process, or the like. When the mass metal element 11 is to be formed through forging, either cold or hot, no particular limitation is imposed on material. For example, carbon steel is employed. An as-forged mass metal element is descaled by, for example, shotblasting. When the mass metal element 11 is to be formed through sintering, a material is selected as appropriate from among pure iron, iron-carbon, iron-copper and the like according to, for example, conditions of use. When the mass metal element 11 is to be formed through press forming, a specific procedure is carried out in the following manner. A thick plate having the first and second protrusions 13 and 14 formed thereon is press-formed into a cylindrical form with its circumferential ends abutting each other. The abutting ends are bonded or left unbonded.

Figure 1:
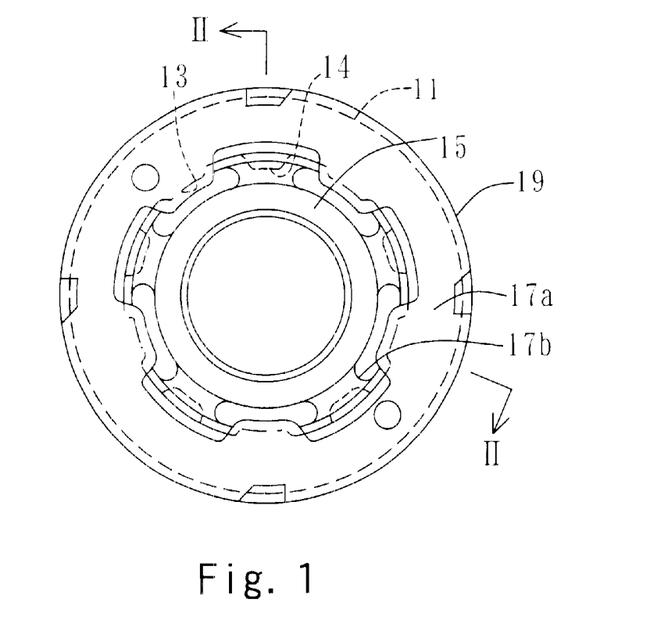
FIG. 1 is a side view showing a dynamic damper according to a first embodiment of the present invention.
Figure 2:
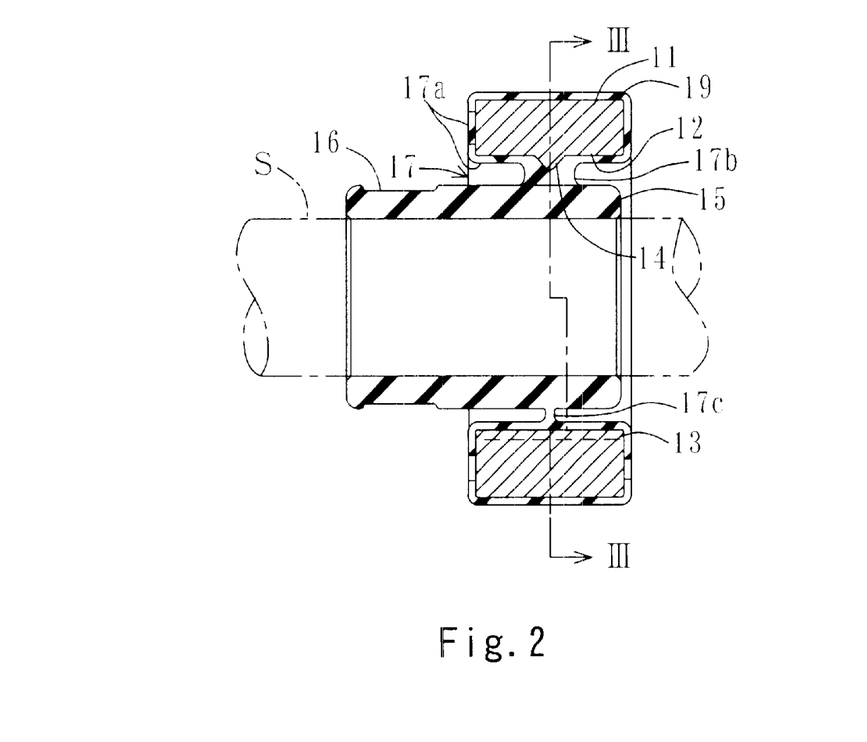
FIG. 2 is a sectional view taken along line II—II of FIG. 1.
Figure 3:
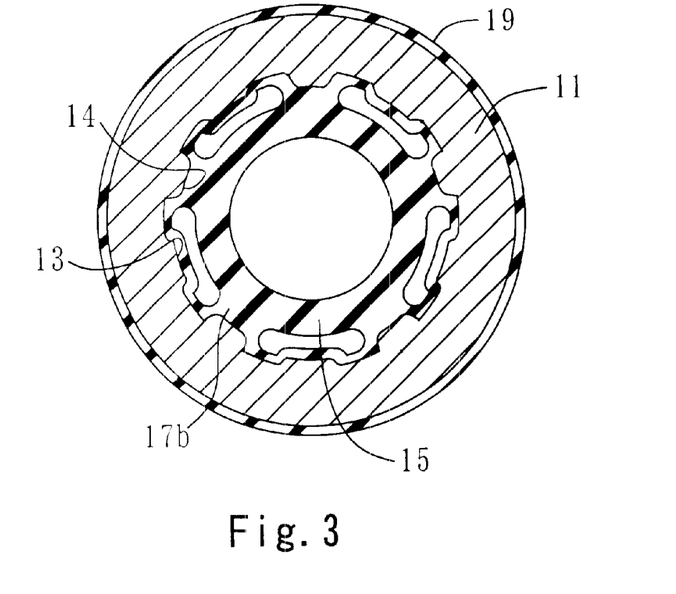
FIG. 3 is a sectional view taken along line III—III of FIG. 2.
Figure 4:
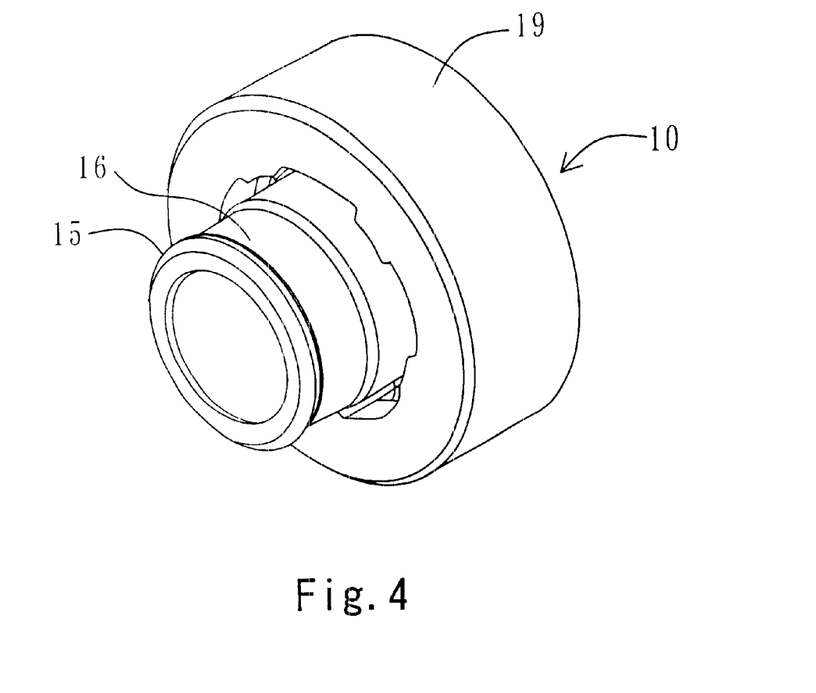
FIG. 4 is a perspective view showing the dynamic damper of FIG. 1.

The elastic-body attachment portion 15 assumes a cylindrical shape whose axial length is about two times that of the mass metal element 11. The elastic-body attachment portion 15 has a clamp groove 16, which is formed on the outer circumference of one axial end of the elastic-body attachment portion 15. The elastic-body attachment portion 15 is fixed to a drive shaft S by use of a clamp member (not shown) fitted into the clamp groove 16. The elastic-body connection portion 17 extends radially outward from the elastic-body attachment portion 15 at an axial position in the vicinity of the other axial end of the portion 15 and is in contact with the mass metal element 11. The elastic-body connection portion 17 includes a thin covering portion 17a, which covers the inner circumferential surface and opposite end faces of the mass metal element 11; main connection portions 17b, which are thick as measured along the axial direction and along the circumferential direction, extend from the elastic-body attachment portion 15, and enclose the corresponding second protrusions 14; and connection portions 17c, each of which is thin as measured along the axial direction and circumferentially connects the adjacent main connection portions 17b. Notably, the elastic-body connection portion 17 is not bonded to the surface of the mass metal element 11. Further, the thin elastic-body covering portion 19 covers the entire outer circumferential surface of the mass metal element 11 in an unbonded condition. However, the elastic-body covering portion 19 can be eliminated as needed. In manufacture, the mass metal element 11, to which no adhesive is applied, is set in a mold, followed by rubber vulcanization molding. As a result, the elastic-body attachment portion 15, the elastic-body connection portion 17, and the elastic-body covering portion 19 are formed integrally with the mass metal element 11, thereby yielding the dynamic damper 10.

As shown in FIG. 2, the thus-configured dynamic damper 10 is press-fitted to the drive shaft S, to which a press fit liquid has been applied, of a vehicle either manually or by use of a jig and then clamped via the elastic-body attachment portion 15. Upon input of detrimental vibrations, such as bending vibration and torsional vibration, induced in association with the rotation of the drive shaft S, the dynamic damper 10 damps the vibrations through absorption effected through compression and shear deformation of the elastic-body connection portion 17, which, in turn, is effected through vibrational resonance of the mass metal 11.

In the dynamic damper 10 of the present embodiment, the mass metal element 11 does not have radially extending through-holes formed therein and is not bonded to the elastic-body connection portion 17, but instead a plurality of first and second protrusions 13 and 14 are formed and arranged intermittently along the circumferential direction on the inner circumferential surface of the mass metal element 11 which comes into contact with the elastic-body connection portion 17. The protrusions 13 and 14 are embedded in the elastic-body connection portion 17, thereby reliably preventing axial movement and circumferential movement of the mass metal element 11 relative to the elastic-body connection portion 17. Thus, the dynamic damper 10 can implement enhanced retention of the mass metal element 11 by means of the elastic-body connection portion 17 without use of adhesive; i.e., in an unbonded condition. Also, since the first and second protrusions 13 and 14 are embedded in the elastic-body connection portion 17, the mass of the mass metal element 11 can be substantially increased without need to increase the size thereof, thereby expanding the range of vibration-damping characteristics effected by the mass metal element 11.

Further, since the first and second protrusions 13 and 14 are embedded in the elastic-body connection portion 17, when the elastic-body attachment portion 15 is fitted onto the drive shaft S, radial expansion of the elastic-body attachment portion 15 imposes a compressive force on the first and second protrusions 13 and 14 of the mass metal element 11, thereby enhancing the retention of the mass metal element 11 by the elastic-body connection portion 17. Also, the elastic-body covering portion 19 protects the mass metal element 11 from smudging and corrosion. Further, since no adhesive is applied to the mass metal element 11, an adhesive application step can be eliminated, thereby simplifying a process for manufacturing the dynamic damper 10 and reducing manufacturing cost.

Next will be described modifications of the protrusions of the mass metal element 11.

Figure 6A:
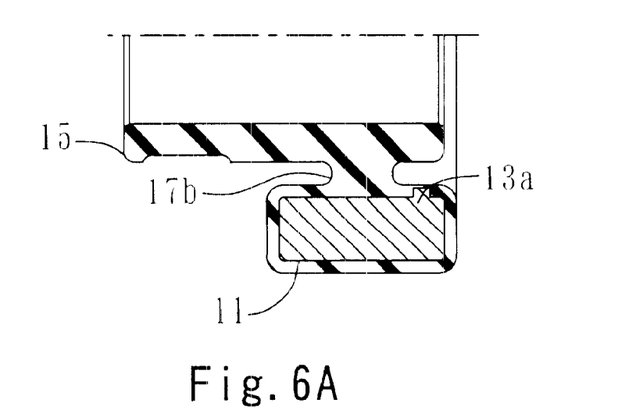
FIGS. 6A to 6C are sectional views partially showing dynamic dampers according to modifications of the first embodiment.
Figure 6B:
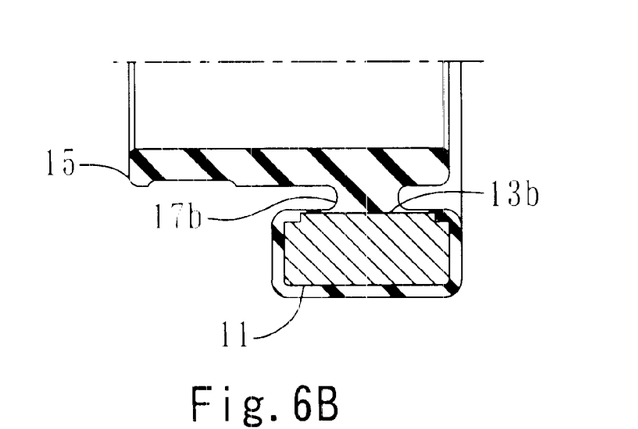
Figure 6C:
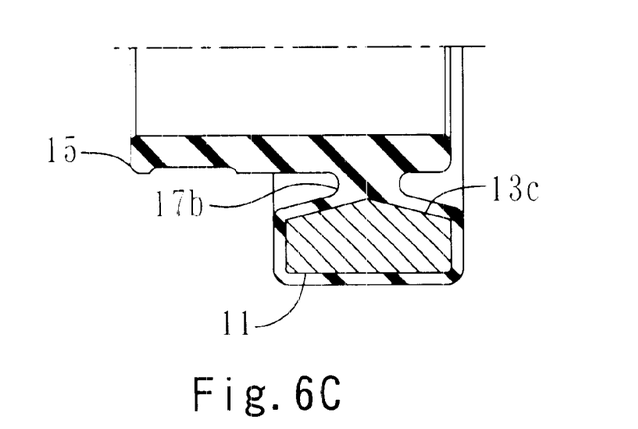

In the above-described embodiment, the second protrusions 14 are arranged so as to be located within the range of the main connection portion 17b of the elastic-body connection portion 17. However, as shown in FIG. 6A, protrusions 13a may be arranged so as to be located axially away from the main connection portion 17b of the elastic-body connection portion 17. Alternatively, as shown in FIG. 6B, axially long protrusions 13b may be arranged while extending beyond the axial range of the main connection portion 17b of the elastic-body connection portion 17. Further, as shown in FIG. 6C, protrusions 13c each having a crest-like, triangular, trapezoidal, or a like cross section protrude along the entire axial length of the mass metal element 11. Also, various modifications are possible in relation to the shape of the protrusions and the arrangement pattern of the protrusions on the inner circumferential surface of the mass metal element.

Figure 7:
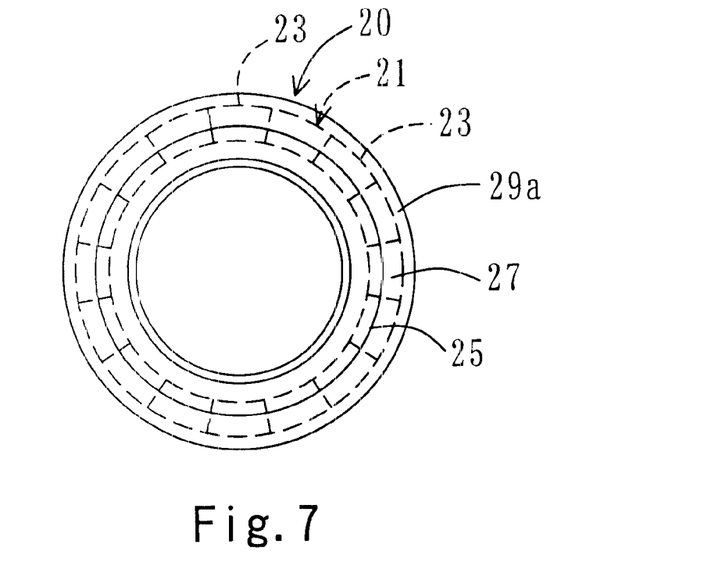
FIG. 7 is a side view showing a dynamic damper according to a second embodiment of the present invention.
Figure 8:
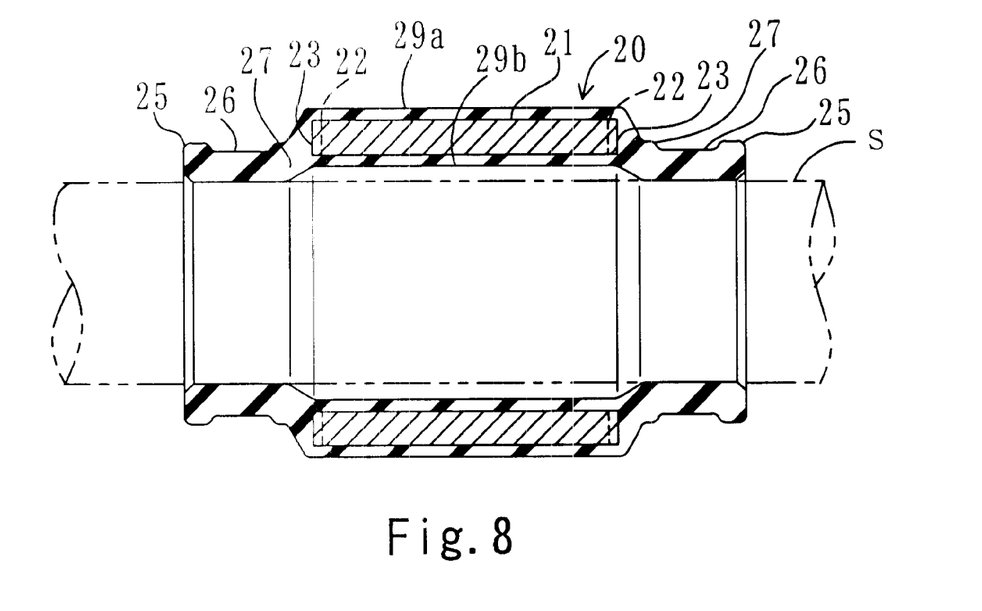
FIG. 8 is an axial sectional view showing the dynamic damper of FIG. 7.
Figure 9:
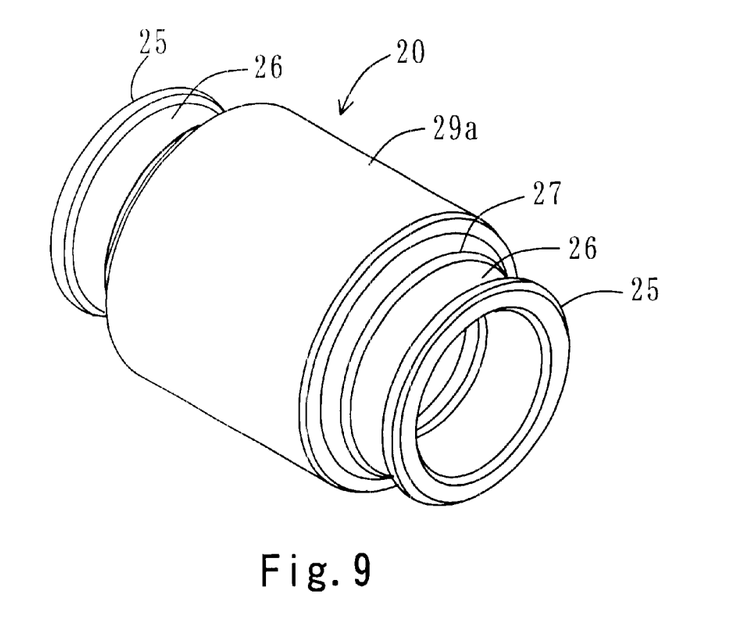
FIG. 9 is a perspective view showing the dynamic damper of FIG. 7.

Next, a second embodiment of the present invention will be described. FIGS. 7 to 9 are a side view, an axial sectional view, and a perspective view of a dynamic damper 20 according to the second embodiment. The dynamic damper 20 is attached to a drive shaft of a vehicle. The dynamic damper 20 includes a cylindrical mass metal element 21; a pair of cylindrical elastic-body attachment portions 25, which are formed from a rubber elastic body and disposed a predetermined distance outwardly away from corresponding axial opposite ends of the mass metal element 21 while being coaxial with the mass metal element 21; a pair of elastic-body connection portions 27, which are formed from a rubber elastic body and adapted to connect the axial opposite ends of the mass metal element 21 and the corresponding elastic-body attachment portions 25 along the entire circumference; and thin elastic-body covering portions 29a and 29b, which cover the inner and outer circumferential surfaces of the mass metal element 21. The elastic-body covering portion 29a, which covers the outer circumferential surface, can be eliminated as needed.

Figure 10:
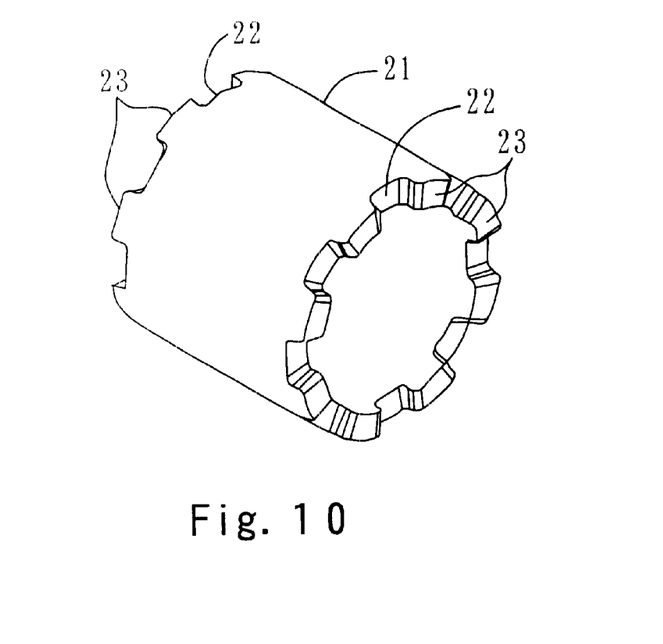
FIG. 10 is a perspective view showing a mass metal element used in the dynamic damper of FIG. 7.

As shown in FIG. 10, the mass metal element 21 is a cylindrical metal element. Axially protruding protrusions 23 are formed and arranged circumferentially at equal intervals on axially opposite end faces 22 of the mass metal element 21. Each of the protrusions 23 extends along the circumferential direction to thereby form a substantially rectangular shape. The shape of the protrusions 23 is not limited to rectangular, but may be triangular, trapezoidal, circular, crest-like or the like. Also, various modifications are possible in relation to, for example, the circumferential length and the number of protrusions. The inner and outer circumferential surfaces of the mass metal element 21 are covered with the thin rubber elastic-body covering portions 29a and 29b in an unbonded condition. The inside diameter of the elastic-body covering portion 29b is several mm greater than the diameter of the drive shaft S.

The paired elastic-body attachment portions 25 are thick-walled cylindrical portions and have an inside diameter that is about 1 mm smaller than the diameter of the drive shaft S. A clamp groove 26 is formed coaxially on the outer circumferential surface of each of the paired elastic-body attachment portions 25. Annular clamp members (not shown) are attached to the corresponding clamp grooves 26. The paired elastic-body connection portions 27 are adapted to connect the paired elastic-body attachment portions 25 and the corresponding opposite ends of the mass metal element 11 and funnel from the elastic-body attachment portions 25 toward the opposite ends of the mass metal element 11. The inner ends of the elastic-body connection portions 27 are integral with the elastic-body covering portions 29a and 29b. In manufacture, the mass metal element 21, to which no adhesive is applied, is set in a mold, followed by rubber vulcanization molding. As a result, the paired elastic-body attachment portions 25, the paired elastic-body connection portions 27, and the elastic-body covering portions 29a and 29b are formed integrally with the mass metal element 21, thereby yielding the dynamic damper 20.

As shown in FIG. 8, the thus-configured dynamic damper 20 is press-fitted to the drive shaft S, to which a press fit liquid has been applied, of a vehicle either manually or by use of a jig and then clamped via the opposite elastic-body attachment portions 25. Upon input of detrimental vibrations, such as bending vibration and torsional vibration, induced in association with the rotation of the drive shaft S, the dynamic damper 20 damps the vibrations through absorption effected through shear deformation of the elastic-body connection portions 27, which, in turn, is effected through vibrational resonance of the mass metal 21.

In the second embodiment, the mass metal element 21 does not have radially extending through-holes formed therein and is not bonded to the paired elastic-body connection portion 27, but instead a plurality of protrusions 23 are formed and arranged intermittently along the circumferential direction on the opposite end faces 22 of the mass metal element 21 which are connected to the corresponding elastic-body connection portions 27. The protrusions 23 are embedded in the paired elastic-body connection portions 27, thereby reliably preventing circumferential movement of the mass metal element 21 relative to the paired elastic-body connection portions 27. Thus, the dynamic damper 20 can implement enhanced retention of the mass metal element 21 by means of the paired elastic-body connection portions 27 without use of adhesive; i.e., in an unbonded condition. Also, since the protrusions 23 are embedded in the paired elastic-body connection portions 27, the mass of the mass metal element 21 can be substantially increased without need to increase the size thereof, thereby expanding the range of vibration-damping characteristics effected by the mass metal element 21. Also, the elastic-body covering portions 29a and 29b protect the mass metal element 21 from smudging and corrosion. Further, since no adhesive is applied to the mass metal element 21, an adhesive application step can be eliminated, thereby simplifying a manufacturing process and reducing manufacturing cost.

The above embodiments are described while mentioning the dynamic dampers used to damp vibrations of a drive shaft of a vehicle. However, the present invention is not limited thereto. The dynamic dampers can be used for other applications. Also, in place of a rubber elastic body, an elastomer elastic body or the like may be used. The dynamic dampers of the above embodiments are mere examples, and the present invention may be embodied in various forms without departing from the spirit and scope of the invention.

What is claimed is:

1. A dynamic damper comprising:

a cylindrical mass metal element; and a cylindrical elastic-body member disposed coaxially with respect to said mass metal element and fitted onto a rotary shaft whose vibrations are to be damped so as to elastically support said mass metal element on said rotary shaft, wherein said elastic-body member is not bonded to said mass metal element, and a plurality of protrusions are formed and arranged circumferentially on a surface of said mass metal element where said mass metal element is supported by said elastic-body member.

2. A dynamic damper comprising:

a cylindrical mass metal element;

a cylindrical elastic-body member extending radially inward from said mass metal element toward a center axis of said mass metal element and fitted onto a rotary shaft whose vibrations are to be damped so as to elastically support said mass metal element on said rotary shaft; and an elastic-body covering portion covering an outer circumferential surface of said mass metal element, wherein said elastic-body member and said elastic-body covering portion are not bonded to said mass metal element, and a plurality of protrusions are formed and arranged circumferentially on an inner circumferential surface of said mass metal element.

3. A dynamic damper comprising:

a cylindrical mass metal element;

a pair of cylindrical elastic-body attachment portions disposed a predetermined distance outwardly away from corresponding axial opposite ends of said mass metal element while being coaxial with said mass metal element, said elastic-body attachment portions each having an inside diameter smaller than that of said mass metal element and being fitted onto a rotary shaft whose vibrations are to be damped so as to fixedly attach said dynamic damper on said rotary shaft;

a pair of elastic-body connection portions adapted to connect the axial opposite ends of said mass metal element and corresponding said elastic-body attachment portions along an entire circumference; and elastic-body covering portions covering inner and outer circumferential surfaces of said mass metal element, wherein said elastic-body connection portions and said elastic-body covering portions are not bonded to said mass metal element, and a plurality of protrusions are formed and arranged circumferentially on opposite end faces of said mass metal element.

\* \* \* \* \*